Patented May 21, 1935

2,001,737

UNITED STATES PATENT OFFICE 2,001,737

ANTHRAQUINONE DERIVATIVES

Ralph Norbeit Lulek, Wilmington, Del., assignor to E. I. du Pont de Nemours & Company, Wilmington, Del., a corporation of Delaware No Drawing. Application August 18, 1931, Serial No. 557,955

9 Claims. (Cl. 260—44)

This invention relates to carbon compounds and methods for their production. More particularly it relates to derivatives of 1-amino-anthraquinone-6-carboxylic acid. It especially contemplates the dyes and dye intermediates produced by the condensation of 1-amino-anthraquinone-6-carboxylic acid with other chemical compounds.

It has been shown by Eckert (Monatshefts für Chemie 35, 289, 1914) that by nitrating anthraquinone-b-aldehyde, oxidizing the resulting nitroanthraquinone-aldehyde, and reducing it to the amino-carboxylic acid of anthraquinone, that the compound produced is 1-amino-anthraquinone-6-carboxylic acid. So far as is known this material has never been used in the production of vat colors or intermediates therefor.

This invention has for an object the production of new and valuable chemical compounds. Other objects are to produce dye intermediates of a novel type, to produce new vat colors, to produce new dyes, to devise processes for the manufacture of new anthraquinone derivatives and in general to advance the art. Other objects will appear hereinafter.

These objects are accomplished by the present invention whereby 1-amino-anthraquinone-6-carboxylic acid is condensed with carbonyl halides, presumably according to the equation:

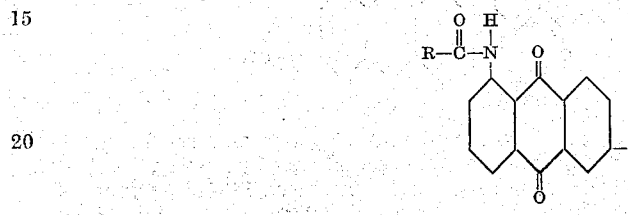

the resultant carboxylic acids changed to the corresponding carbonyl chlorides, presumably according to the equation:

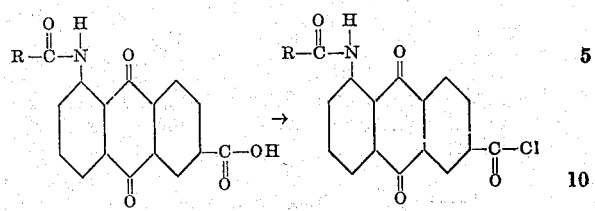

and the resultant acid chlorides thereafter condensed with amines, presumably according to the equation:

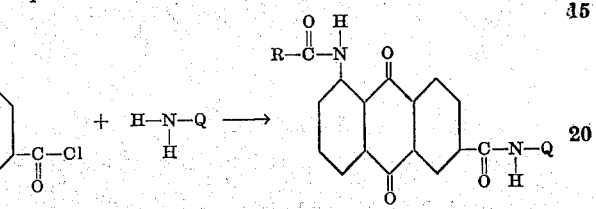

In the general process of this invention as set out in the preceding equations and formulae, R and Q represent carbon compound radicals or nuclei. The invention will be further understood from a consideration of the following examples in which the proportions are given by weight.

PART I—CONDENSATION WITH CARBONYL HALIDES

Example I

Ten (10) parts of 1-amino-anthraquinone-6-carboxylic acid are heated and stirred with 11.8 parts of 1,9-anthraisothiazole-2-carbonyl-chloride in 300 parts nitrobenzene to 150° C. for one hour. The new condensation product separates out in yellow needles and may be filtered off after cooling the charge. The reaction involved is represented by the following probable equation:

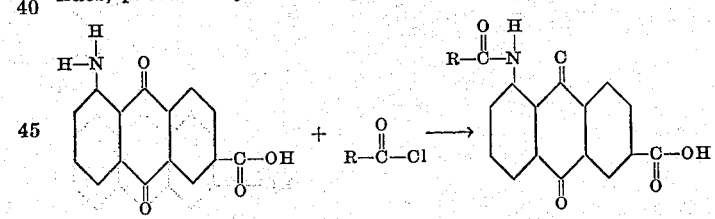

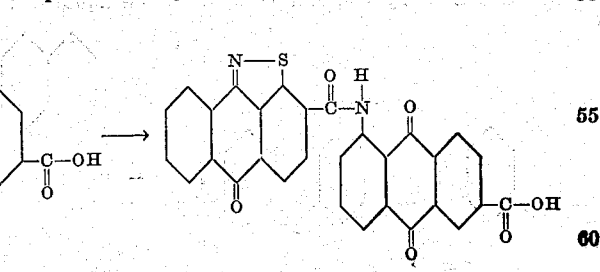

Example II

Ten (10) parts of 1-amino-anthraquinone-6-carboxylic acid are heated and stirred with 13 parts of 1,9-anthraiso-selenazole-2-carbonyl-chloride in 300 parts nitrobenzene to 150° C. for one hour. The new condensation product separates out in yellow needles and may be filtered off after cooling the charge. The reaction involved is represented by the following probable equation:

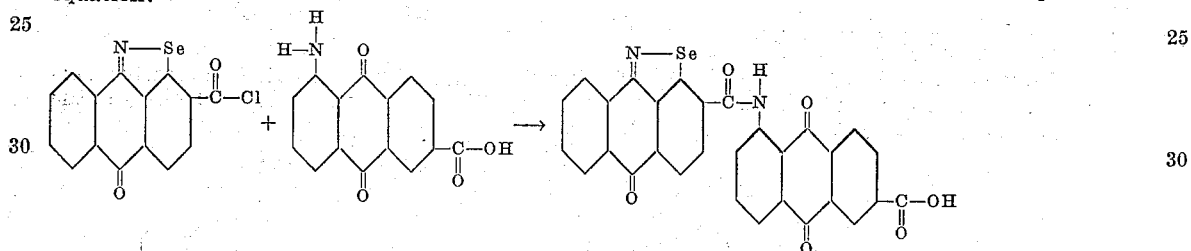

Example III

Ten (10) parts of 1-amino-anthraquinone-6-carboxylic acid were reacted with 7.5 parts of beta-naphthoyl-chloride in 70 parts of ortho-dichloro-benzene by heating at 125-145° C. for 1-2 hours. The resultant compound was isolated, washed and dried. The reaction taking place is represented by the following probable equation:

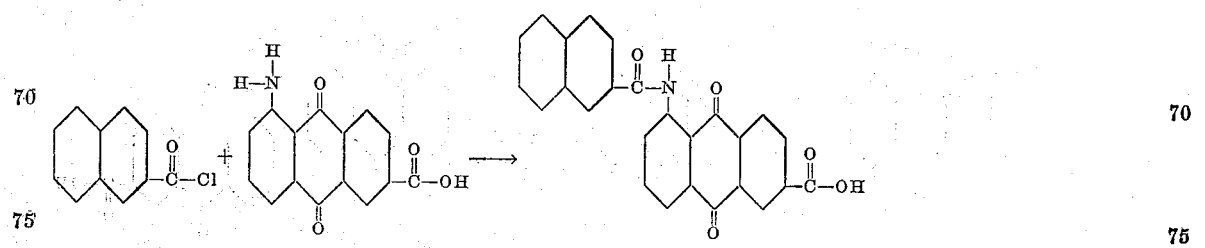

Example IV

Ten (10) parts of 1-amino-anthraquinone-6-carboxylic acid were reacted with 8 parts of meta-methoxy-benzoyl-chloride in 100 parts of xylene while heating at 130-150° C. for 1-2 hours. The reaction taking place is represented by the following probable equation:

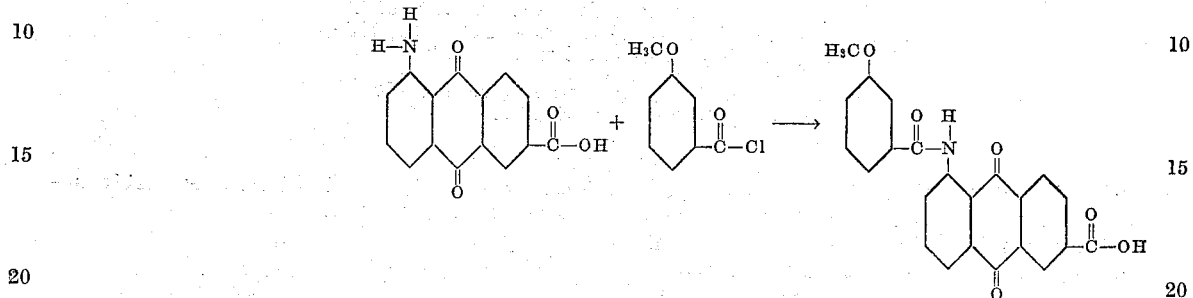

Example V

Ten (10) parts of 1-amino-anthraquinone-6-carboxylic acid and 3.8 parts of tere-phthaloyl-chloride were caused to react by heating together in 80 parts of nitrobenzene at 140-150° C. for 1-2 hours. The product which formed was separated, suitably purified and dried. The reaction taking place is represented by the following probable equation:

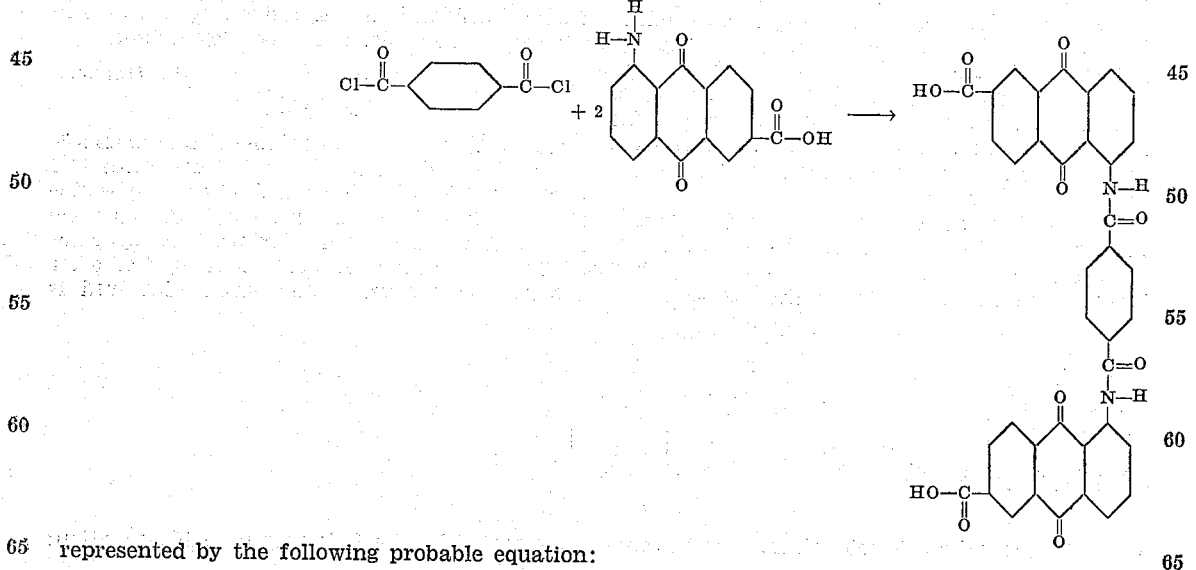

Example VI

Ten (10) parts of 1-amino-anthraquinone-6-carboxylic acid were suspended in 50-80 parts of nitrobenzene and 7 parts of benzoyl-chloride added. The solution was heated to 120-130° C.

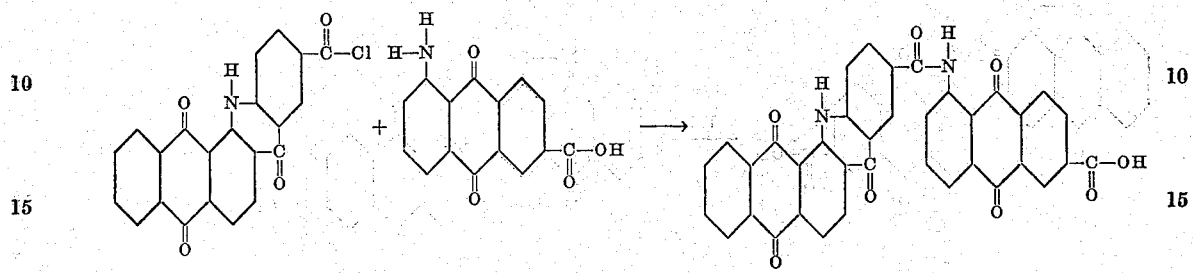

and the temperature maintained at this point for one hour. The mass was then cooled, filtered and washed. The reaction involved is represented by the following probable equation:

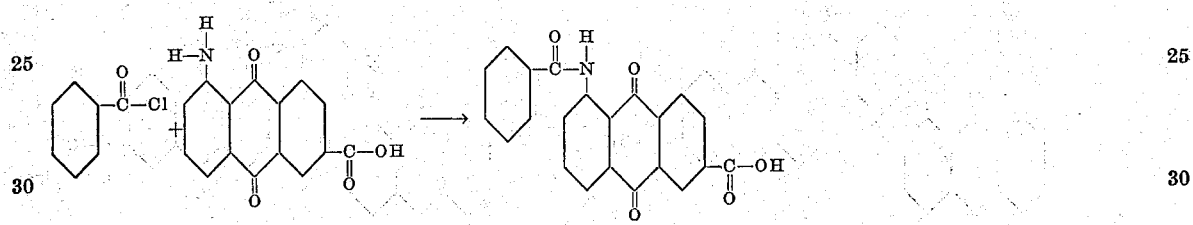

Example VII

Ten (10) parts of 1-amino-anthraquinone-6-carboxylic acid and 10.2 parts of anthraquinone-2-carbonyl-chloride were condensed at 150° C. in 100 parts of nitrobenzene. A product giving a yellow sulphuric acid solution and a wine colored alkaline hydrosulphite vat was produced. The reaction taking place is illustrated by the following probable equation:

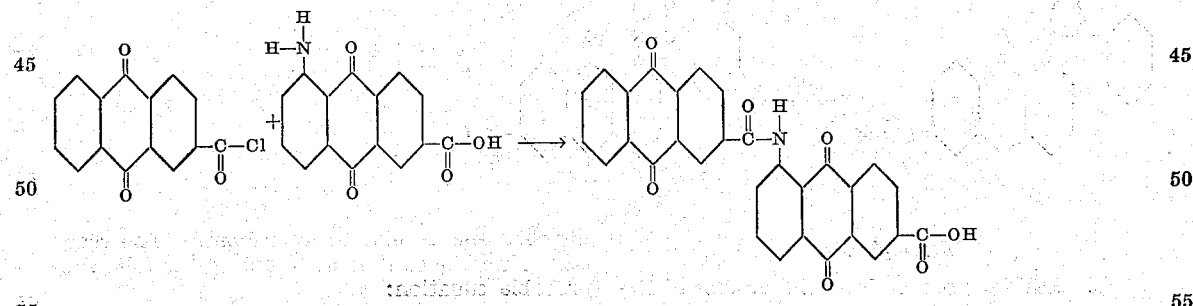

This new product after being vatted and applied to the fiber oxidized through green and brown to a light yellow.

Example VIII

Ten (10) parts of 1-amino-anthraquinone-6-carboxylic acid were heated together with 14.5 parts of anthraquinone-2:1-phenyl-acridone-4'-carbonyl-chloride in 100 parts of nitrobenzene to 120-130° C. The reaction was finished after about one-half hour. The mass was cooled to 80° C., filtered, washed and dried. The reaction taking place is represented by the following probable equation:

PART II—CONVERSION TO CARBONYL HALIDES

Example IX

The wet cake from Example I was suspended in 100 parts of nitrobenzene, 16 parts of phosphorus pentachloride added, the mass heated to 100° C. and held for one hour. Thereafter the reaction mass was cooled, the acid chloride filtered, the filtered material washed with nitrobenzene, and benzene, and dried. The resultant product was a yellow crystalline powder, soluble in concentrated sulphuric acid and pyridine with a yellow color. The reaction involved may be represented by the following probable equation:

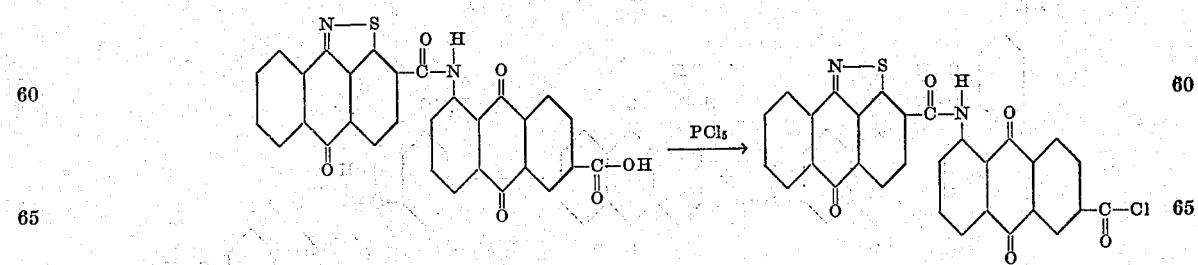

Example X

The wet cake from Example II was suspended in 100 parts nitrobenzene, 16 parts of phosphorus pentachloride added, the mass heated at 100° C. for one hour and afterwards cooled. When cooled the acid chloride was filtered, washed with nitrobenzene and benzene and dried. The resultant product was a dark yellow crystalline powder soluble in concentrated sulphuric acid and pyridine with a yellow color. The reaction taking place was represented by the following probable equation:

ample VIII was suspended in 40–50 parts of nitrobenzene and 10 parts of phosphorus pentachloride added. The suspension was heated to 80° C. When the reaction was complete the resultant acid chloride was isolated by filtration. The reaction taking place is represented by the following probable equation:

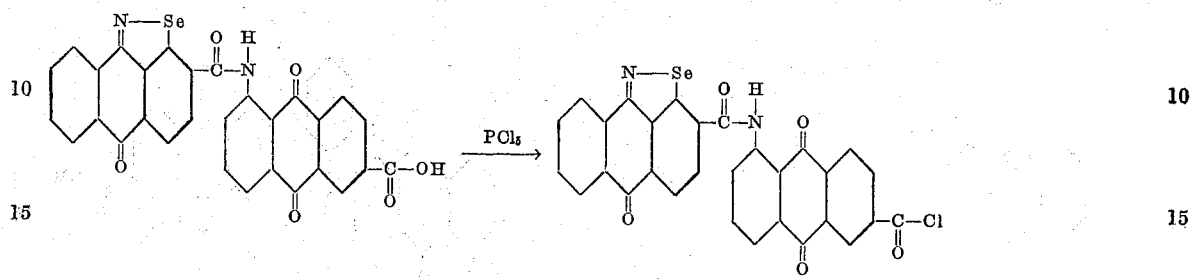

Example XI

The filter cake resulting from Example VI was suspended in 30 parts of nitrobenzene and thereafter 10 parts of phosphorus pentachloride added. The mixture was heated to 100° C. and maintained at that temperature for one-half hour. The resultant product was filtered at room temperature, washed and dried. The reaction taking place is represented by the following probable equation:

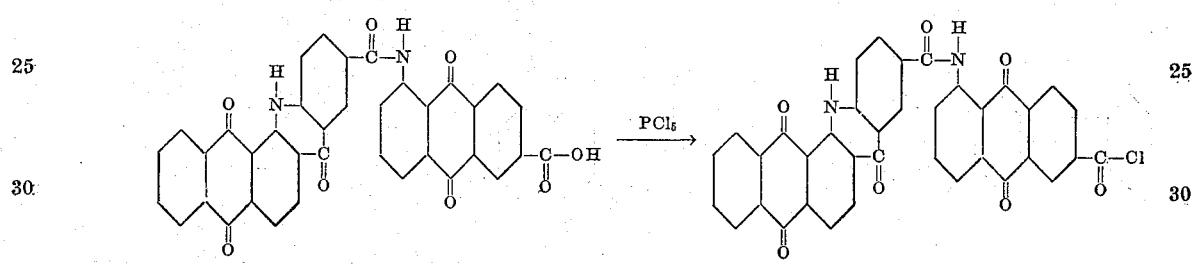

Example XII

The resultant product from the process of Ex-

Part III—Condensation with Amines

Example XIII

Ten (10) parts of 1-meta-methoxy-benzoyl-amino-anthraquinone-6-carbonyl chloride (Ex. IV) were condensed with 5.3 parts of alpha-amino-anthraquinone by heating in 125 parts of nitrobenzene at 140° C. for 2 hours. The reaction taking place is represented by the following probable equation:

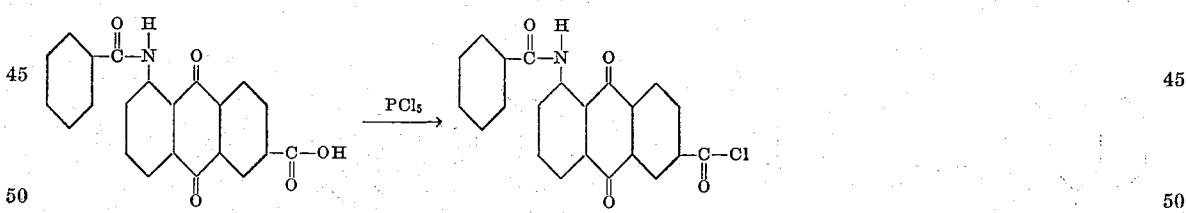

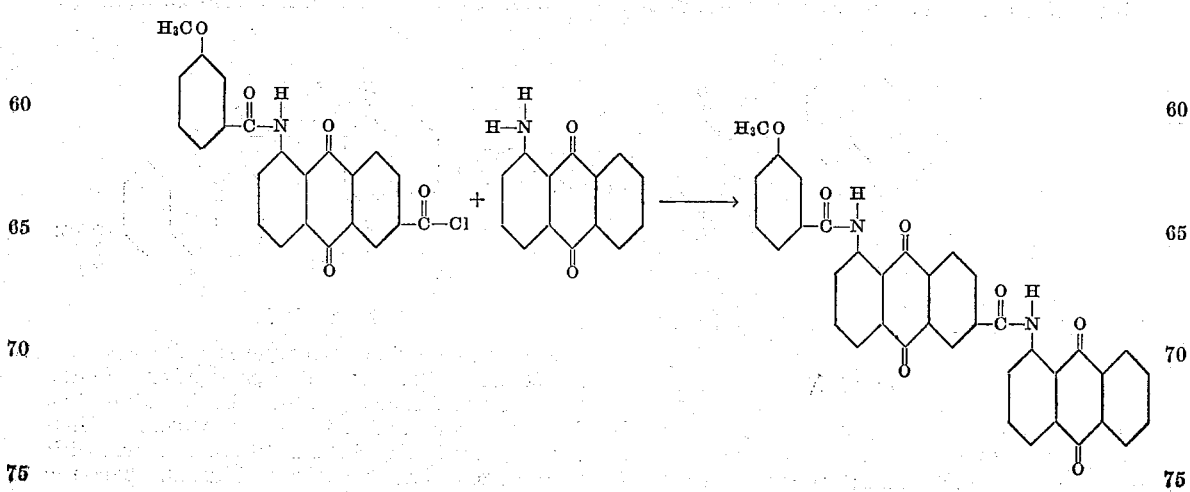

Example XIV

Ten (10) parts of 1-benzoyl-amino-anthraquinone-6-carbonyl-chloride (Exs. VI and XI) were heated with 5.7 parts of alpha-amino-anthraquinone in 150 parts of nitrobenzene to 130–140° C. and this temperature maintained for about one hour. The mass was then cooled to 60–70° C. and filtered, washed and dried. It is a yellowish powder, soluble in sulphuric acid with a yellow color and dyes cotton in yellowish shades. The reaction taking place is represented by the following probable equation:

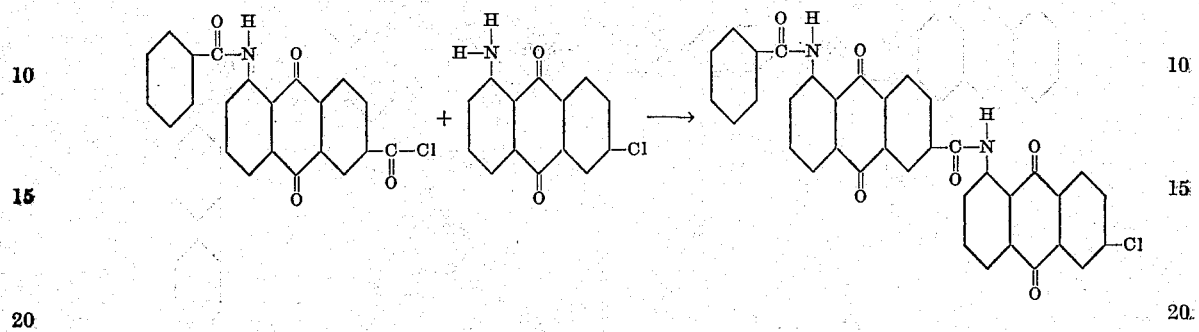

Example XV

Ten (10) parts of 1-benzoyl-amino-anthraquinone-6-carbonyl-chloride (Exs. VI and XI) were suspended in 200 parts of nitrobenzene and 6.6 parts of 1-amino-6-chloro-anthraquinone added. The suspension was heated to 140–150° C. and maintained at this temperature for one hour. The resultant mass was then cooled to 80° C., filtered, washed and dried. The resultant product is a yellow powder soluble in sulphuric acid with a yellow color and dyes cotton in yellow shades of extreme fastness. The reaction taking place is represented by the following probable equation:

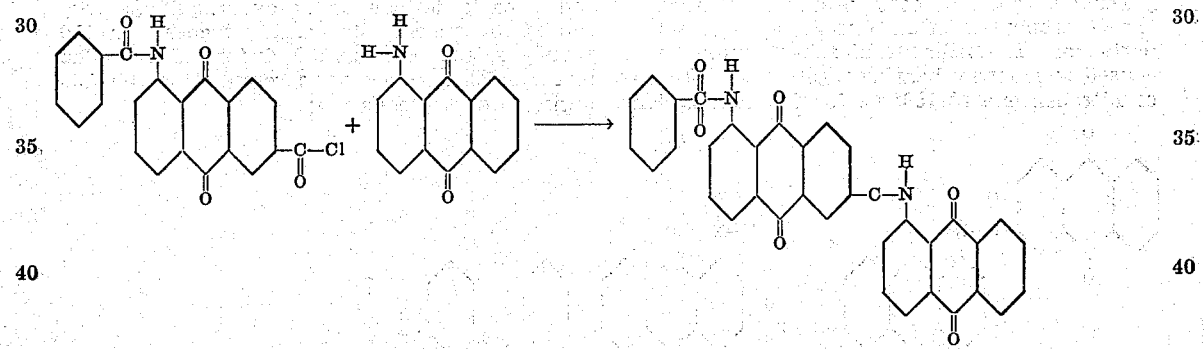

Example XVI

Ten (10) parts of benzoyl-amino-1-anthraquinone-6-carbonyl-chloride (Exs. VI and XI) were reacted with 1.4 parts of para-phenylene-diamine in 100 parts of nitrobenzene while the temperature was maintained at about 150° C. The reaction taking place is illustrated by the following probable equation:

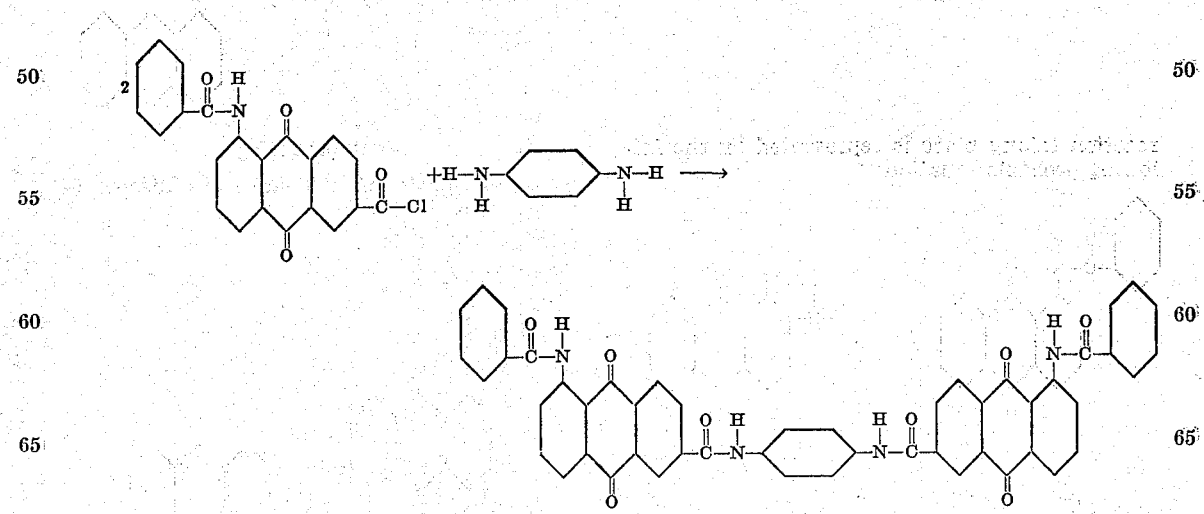

Example XVII

Ten (10) parts of benzoyl-amino-anthraquinone-6-carbonyl-chloride (Exs. VI and XI) and 2.36 parts of benzidine were caused to react by heating together in 150–200 parts of nitrobenzene at 140–150° C. for 2 hours. The reaction taking place is represented by the following probable equation:

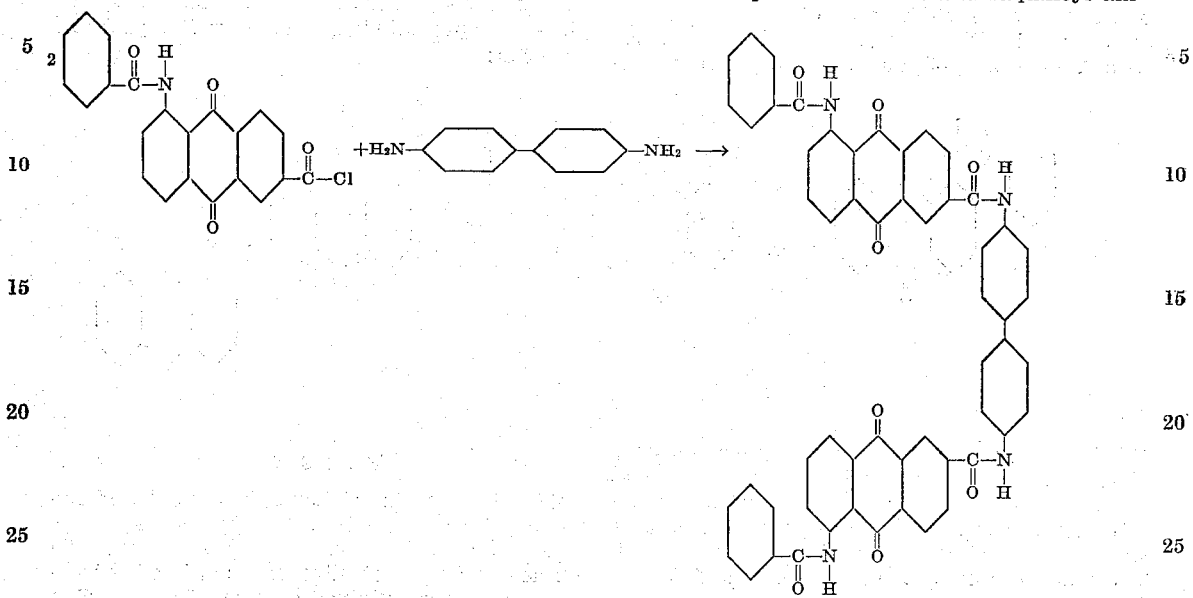

Example XVIII

Ten (10) parts of benzoyl-amino-anthraquinone-6-carbonyl-chloride (Exs. VI and XI) and 6.5 parts of 1,9-anthraisothiazole-2-amine were caused to react by heating together in 250 parts of nitrobenzene at 150° C. for 2-3 hours. The reaction taking place is represented by the following probable equation:

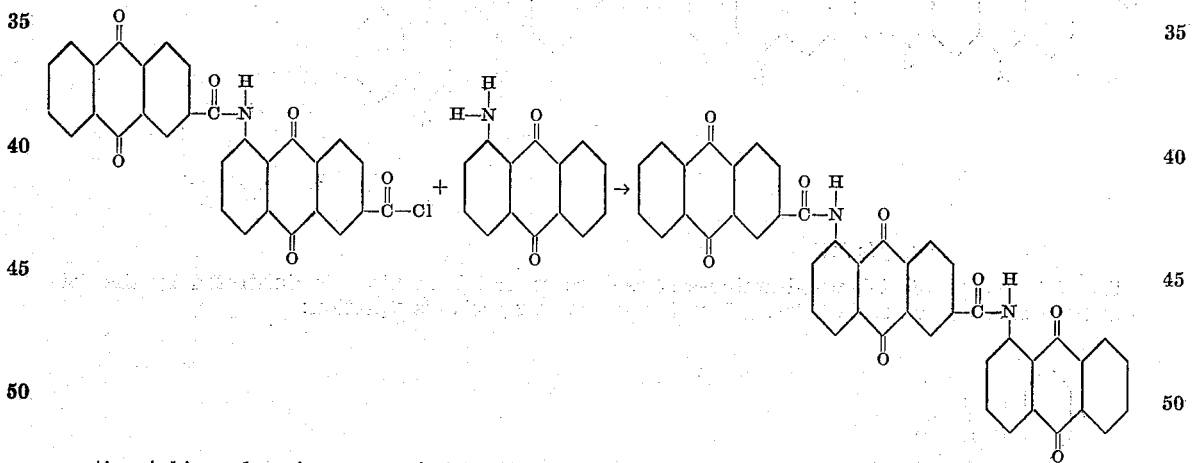

The resultant product was isolated and dried. It gives a yellow to orange color in sulphuric acid and a red colored alkaline hydrosulphite vat. The leuco compound oxidizes on cotton through orange to yellow-brown to yellow shades.

Example XIX

Ten (10) parts of 1-beta-anthraquinoyl-amino-anthraquinone-6-carbonyl-chloride (Ex. VII) and 4.3 parts of alpha-amino-anthraquinone were caused to condense by heating together in 150 parts of nitrobenzene at 150° C. for 2 hours. The reaction taking place is represented by the following probable equation:

Example XX

Ten (10) parts of 1',9'-anthraisothiazoyl-1-amino-anthraquinone-6-carbonyl-chloride (Exs. I and IX) were heated with 4.5 parts of alpha-amino-anthraquinone in 250 parts of nitrobenzene at 150-160° C. for about one hour. The resultant yellow crystalline mass was cooled to 70° C. and

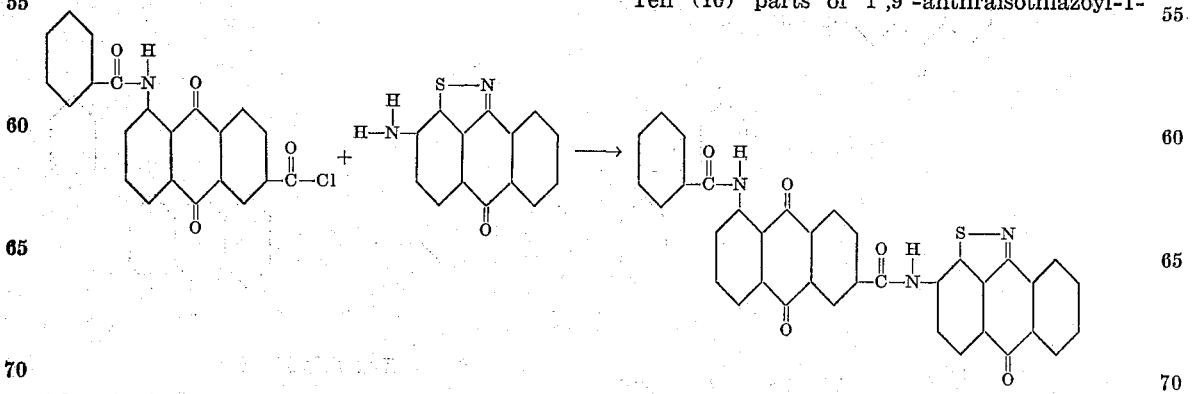

filtered. The product was thereafter washed with nitrobenzene and alcohol and dried. The product dissolves in sulphuric acid with a yellowish-orange color and dyes from a reddish-blue vat in greenish-yellow shades. The reaction taking place is represented by the following probable equation:

Example XXII

In 250 parts of nitrobenzene there was suspended 10 parts of 1',9'-anthraisothiazoyl-1-amino-anthraquinone-6-carbonyl-chloride (Exs. I and IX) and 6.2 parts of mono-benzoyl-1,5-di-amino-anthraquinone and the resultant suspension heated to 150° C. for a period of one and one-half

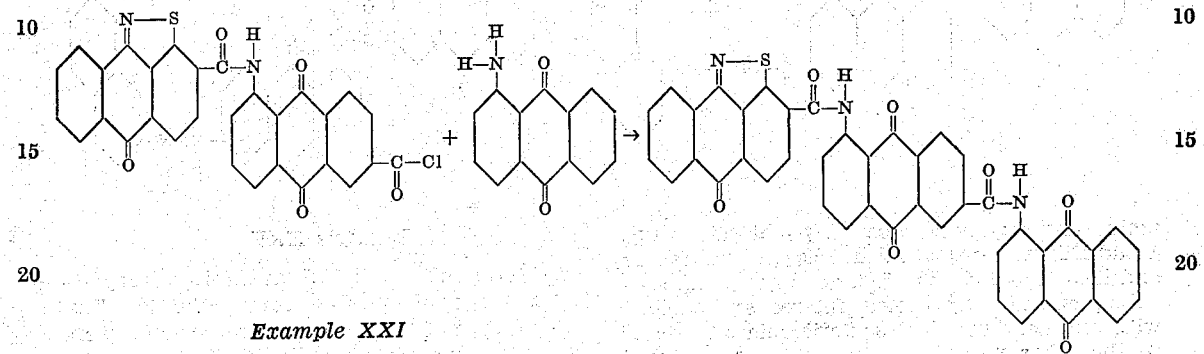

Example XXI

A suspension of 10 parts of 1',9'-anthraisothiazoyl-1-amino-anthraquinone-6-carbonyl-chloride (Exs. I and IX) and 4.7 parts of 1-amino-6-chloro-anthraquinone in 300 parts of nitrobenzene was heated to 140-150° C. until no unchanged starting material remained. After cooling to about 80° C. the resultant dyestuff was filtered off, washed with nitrobenzene and benzene and dried. It dissolves with a yellow color hours. The product which consisted of yellow needles separated out and was filtered at 80-90° C., washed with nitrobenzene and alcohol, and dried. It dissolves in concentrated sulphuric acid with yellow to orange color and dyes cotton from a blue vat in fast yellow shades. The reaction involved is disclosed by the following probable equation:

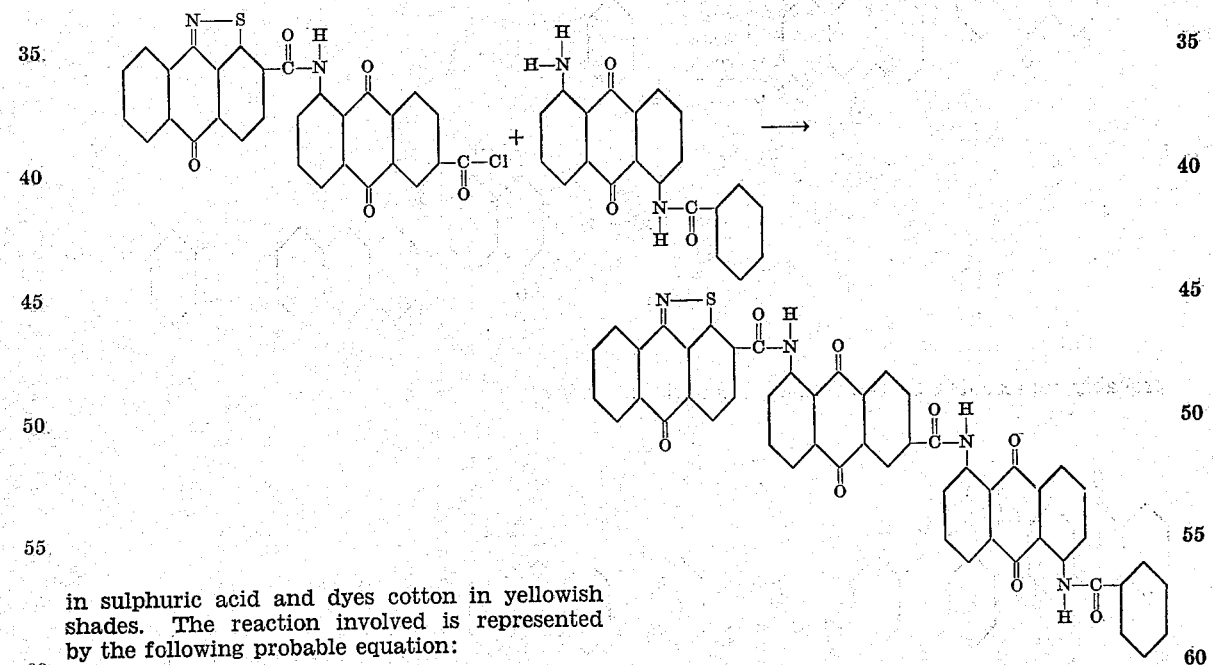

in sulphuric acid and dyes cotton in yellowish shades. The reaction involved is represented by the following probable equation:

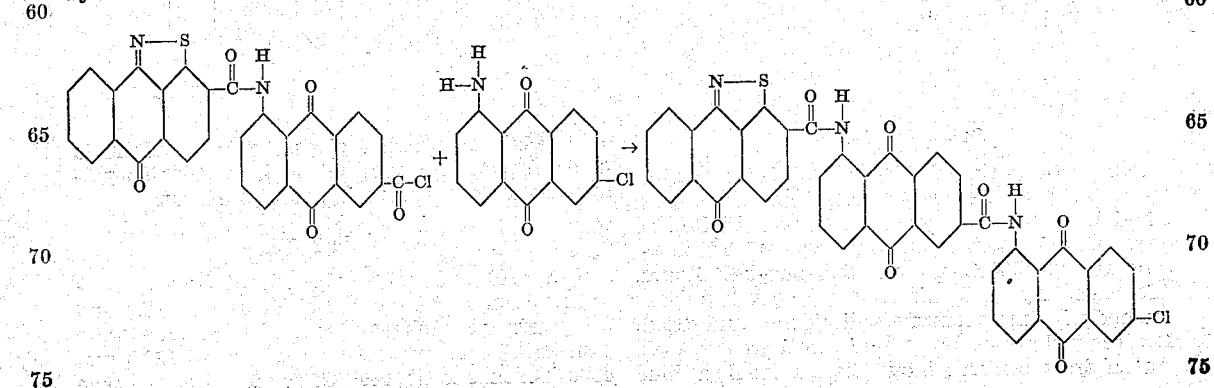

Example XXIII

Ten (10) parts of 1′,9′-anthraisothiazoyl-1-amino-anthraquinone-6-carbonyl-chloride (Exs. I and IX) was suspended in 200 parts of aniline and heated at 135–150° C. for one hour. The reaction mixture was cooled, filtered and washed with aniline, dilute hydrochloric acid and water in the order named. A dyestuff was produced which was yellow to orange in color when dissolved in sulphuric acid and which dyed cotton in greenish-yellow shades from a blue alkaline hydrosulphite vat. The reaction taking place is probably represented by the following equation:

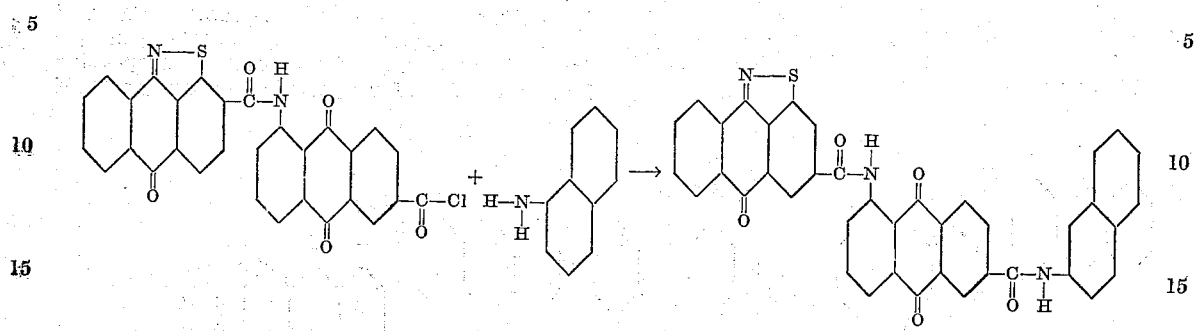

Example XXIV

Ten (10) parts of 1′,9′-anthraisothiazoyl-1-amino-anthraquinone-6-carbonyl-chloride (Exs. I and IX) and 2.6 parts of alpha-naphthylamine were heated together in 150 parts of nitrobenzene at 140–150° C. for one and one-half hours. After cooling and filtering the product was washed with nitrobenzene and alcohol and dried. It gives yellow sulphuric acid solutions and dyes cotton in greenish-yellow shades from a blue hydrosulphite vat. The reaction taking place is probably represented by the following equation:

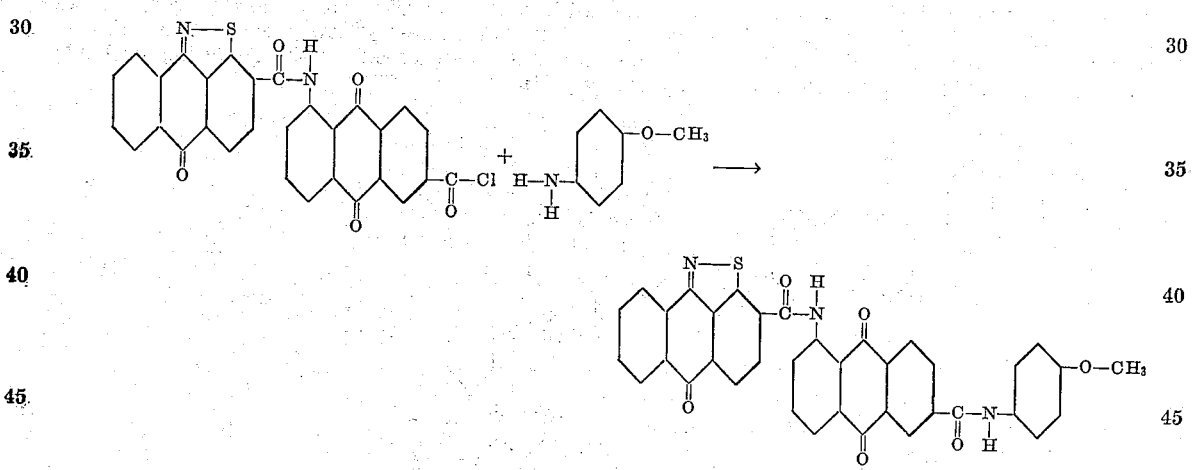

Example XXV

Ten (10) parts of 1′,9′-anthraisothiazoyl-1-amino-anthraquinone-6-carbonyl-chloride (Exs. I and IX) and 3 parts of para-anisidine were heated together in 150 parts of nitrobenzene at 140–150° C. for one to two hours. The reaction mixture was cooled, filtered and washed with nitrobenzene and alcohol. The reaction taking place is represented by the following probable equation:

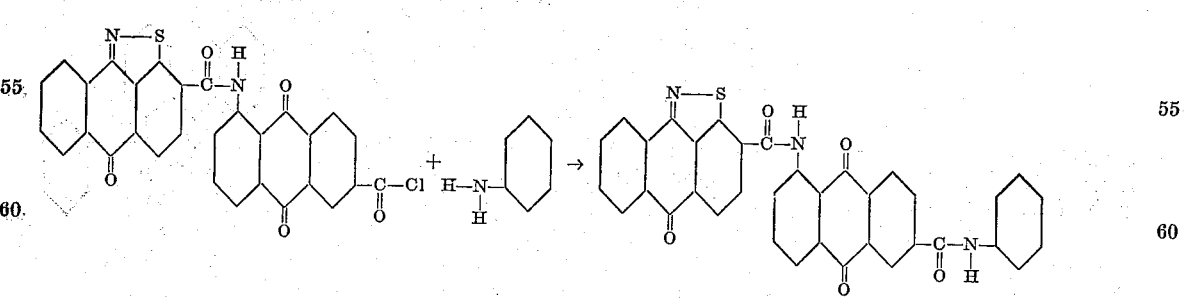

The resultant product gives a yellow sulphuric acid solution and dyes cotton in a greenish-yellow shade from a blue hydrosulphite vat.

Example XXVI

Ten (10) parts of 1-beta-naphthoyl-amino-anthraquinone-6-carbonyl-chloride (Ex. III) and 5.1 parts of alpha-amino-anthraquinone were caused to react by heating together in 120 parts of nitrobenzene at 140° C. for 1–2 hours. The reaction taking place is illustrated by the following probable equation:

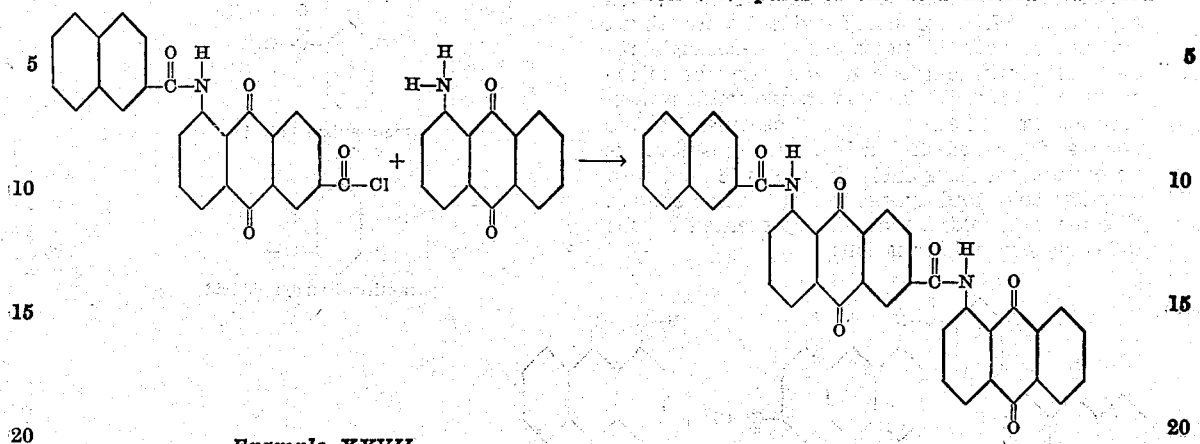

Example XXVII

Ten (10) parts of the acid chloride obtained according to Examples VIII and XII, were heated together with 3.4 parts of alpha-amino-anthraquinone in 150 parts of nitrobenzene to 140–150° C. The temperature was maintained for one hour after which the mass was cooled to 70–80° C. and filtered. The resultant product is an orange powder which dissolves in sulphuric acid to a yellow color and dyes cotton in orange shades. The reaction taking place is represented by the following probable equation:

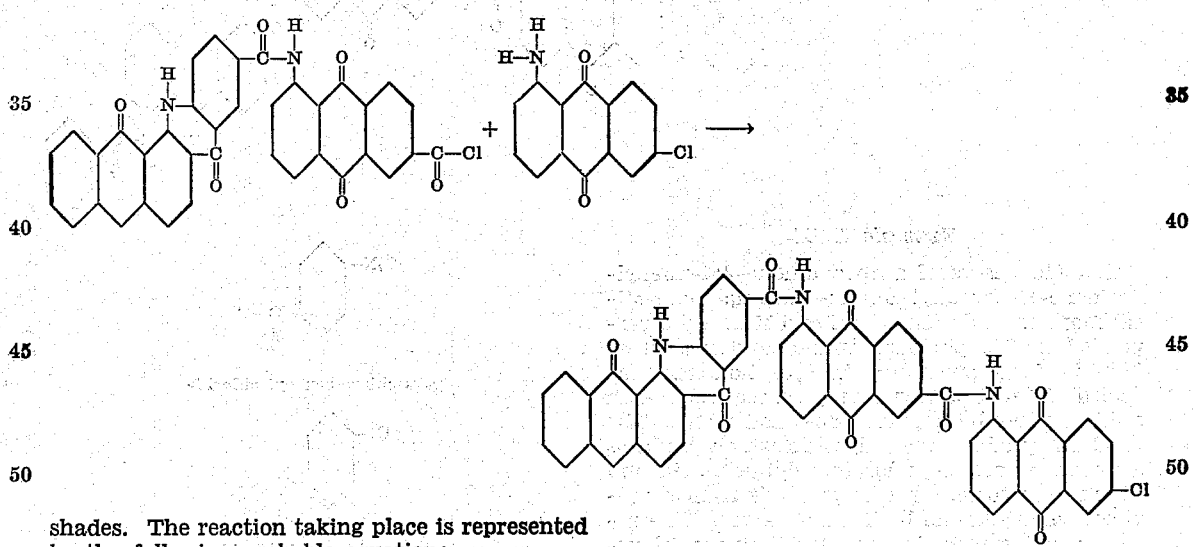

Example XXVIII

Ten (10) parts of the acid chloride obtained according to Examples VIII and XII, were suspended in 150 parts of nitrobenzene and 3.9 parts of 1-amino-6-chloro-anthraquinone added. The temperature was raised to 130–140° C. The condensation product separated out in the form of yellow-orange crystals and was filtered at 70–80° C. It dyes cotton in yellow-orange shades from a Bordeaux vat. The reaction taking place is represented by the following probable equation:

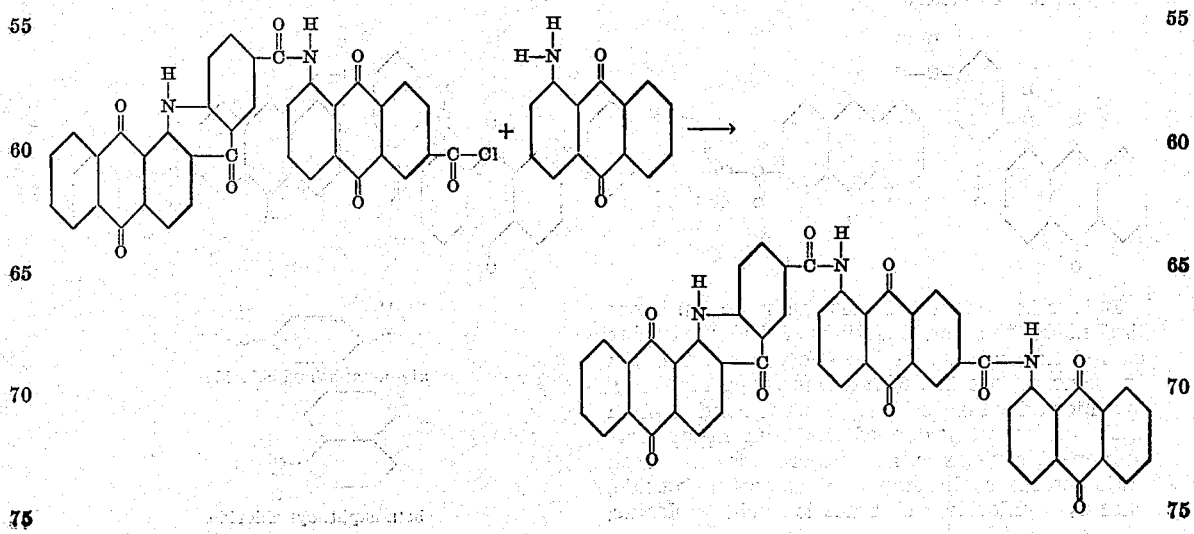

Example XXIX

Ten (10) parts of the acid chloride obtained according to Examples VIII and XII, were stirred and heated with 5.2 parts of mono-benzoyl-1:5-di-amino-anthraquinone in 150 parts of nitrobenzene to 140-150° C. The orange condensation product was filtered off after heating for one hour and washed and dried. The resultant is an orange powder soluble in sulphuric acid with a yellow color and dyes cotton in orange shades. The reaction taking place is represented by the following probable equation:

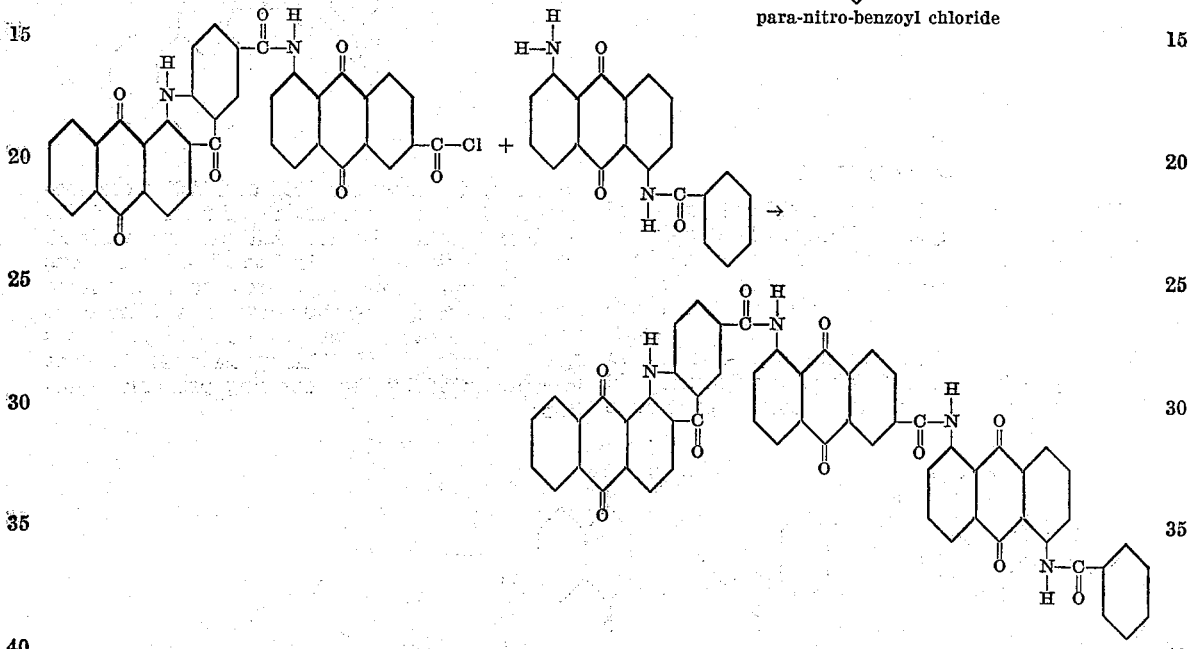

Example XXX

Ten (10) parts of anthraquinone-2:1-phenyl-acridone-4'-carbonyl-amino-anthraquinone-6''-carbonyl-chloride (Exs. VIII and XII) were suspended in 200 parts of aniline and heated at 135-150° C. for one hour. The reaction mass was cooled, filtered and washed, respectively, with aniline, dilute hydrochloric acid and water. The resultant product was a dyestuff which produces a yellow to orange color in sulphuric acid and which dyes cotton an orange shade from a red-violet-color-alkaline hydrosulphite vat. The reaction taking place is represented by the following probable equation:

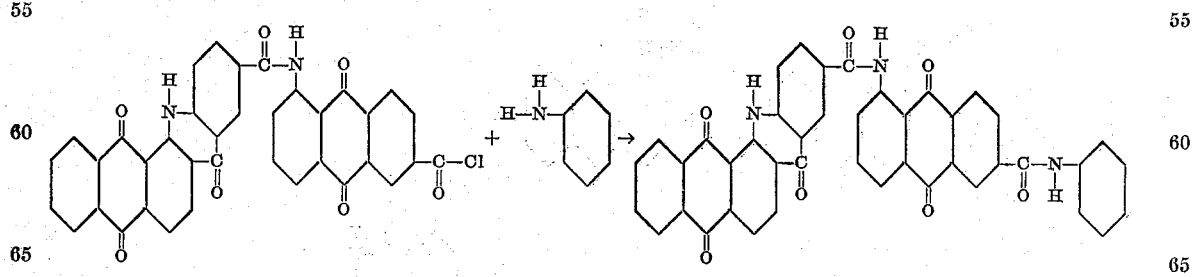

It is to be understood that the invention is not limited to the condensation of the particular compounds set out in the above examples. In the general formula, R and Q may represent any organic radical or residue. For the condensation with the amino group of the 1-amino-anthraquinone-6-carboxylic acid, there may be used satisfactorily such compounds as acetyl chloride, succinyl chloride, chloracetic acid chloride, propionyl chloride, oxalyl chloride, benzoyl chloride

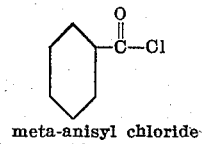

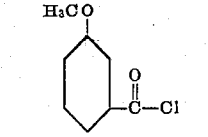

meta-anisyl chloride

para-nitro-benzoyl chloride

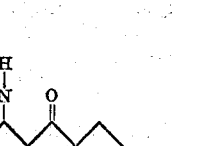

para-chloro-benzoyl chloride

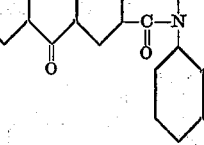

tere-phthaloyl-chloride

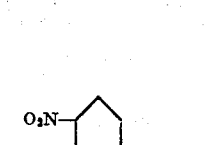

alpha-naphthoyl-chloride

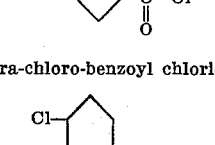

beta-naphthoyl chloride

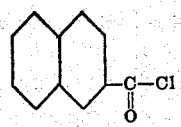
beta-anthraquinone-carbonyl-chloride

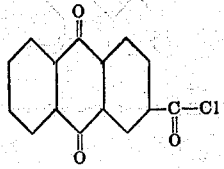
1-chloro-anthraquinone-6-carbonyl-chloride

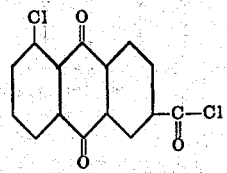
1-chloro-anthraquinone-2-carbonyl-chloride

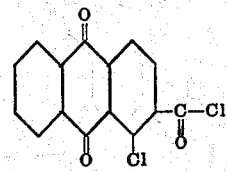
1 : 9-anthraisothiazole-2-carbonyl-chloride

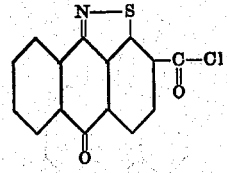
1 : 9-anthraisothiazole-4-carbonyl-chloride

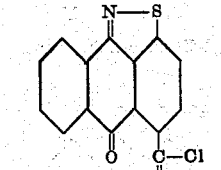
1 : 9-anthraisothiazole-5-carbonyl-chloride

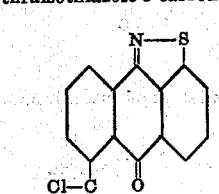
1 : 9-anthraisothiophene-2-carbonyl-chloride

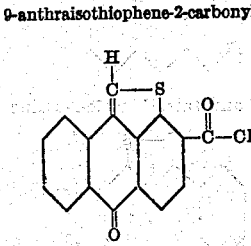
anthraquinone-2 : 1-phenyl-acridone-4'-carbonyl-chloride

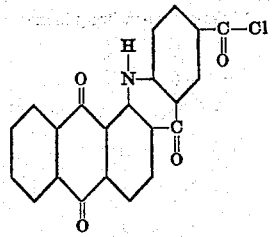

For the condensation with the acid chloride group of the 1-amino-anthraquinone-6-carbonyl-chloride, desirable results are produced with such compounds as ethyl amine, methyl amine, aniline

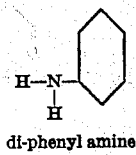
di-phenyl amine

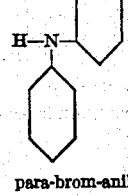
para-brom-aniline

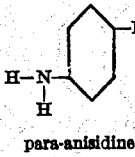
para-anisidine

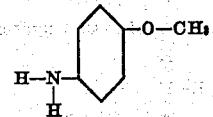
2 : 5-di-chlor-aniline

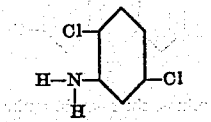
para-phenylene-di-amine

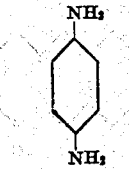
beta-naphthylamine

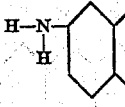
alpha-naphthylamine

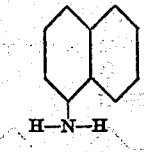
benzidine

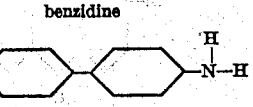

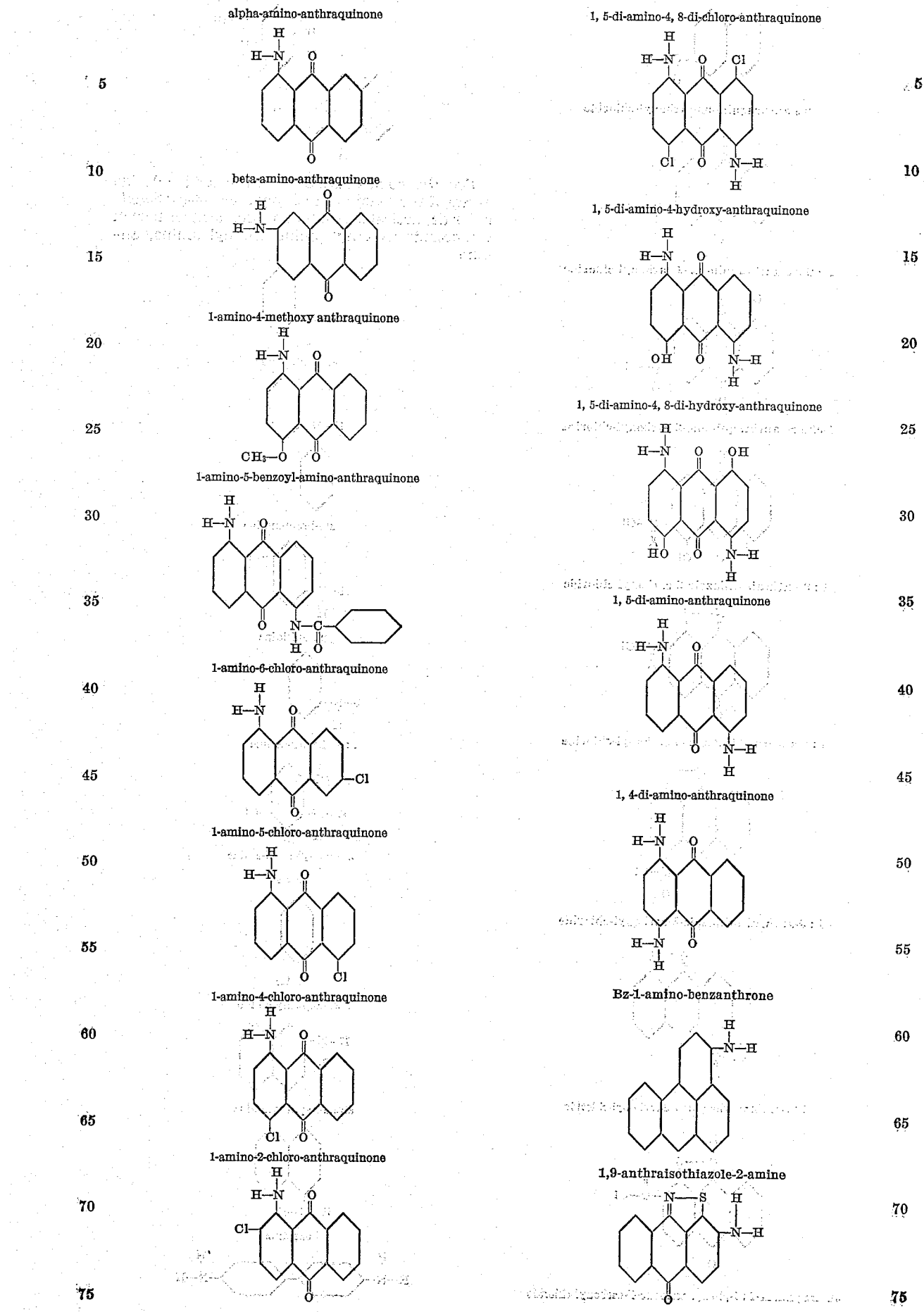

1,9-anthraisothiazole-5-amine

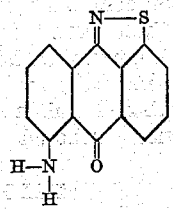

It is desired to emphasize the fact that the above examples and list of specific compounds are merely given as outstanding examples and in no way limit the invention. So far as now appears any amine or carbonyl halide may be used in the condensations set out. While carbonyl-chlorides have been used in the specification to illustrate the invention, it is to be understood that carbonyl halides in general may be utilized.

In the course of the specification certain equations and formulae have been given for the purpose of aiding in understanding the invention and it is to be understood that it is not desired to limit the invention thereby.

As will be clear from the examples the solvent (if any) used may be varied over a wide range depending upon the characteristics of the particular condensation being carried out. The particular temperatures and time utilized for the various condensations depend upon the physical characteristics of the substances being condensed. The solvent, temperature, time and other mechanical features of the invention which are most desirable for any particular reaction may be readily determined by one skilled in the art.

Any desired agent may be used for the conversion to the carbonyl halide.

Throughout the specification and claims the term "vat color" is used to cover compounds susceptible to vatting by any of the well known methods.

By this invention an entire new field of anthraquinone vat dyestuffs is opened. The compounds produced have very desirable properties. While the shade of the dyestuffs produced varies with the particular formulae in general, the colors fall within the range of orange, yellow and brown.

As many apparently widely different embodiments of this invention may be made without departing from the spirit and scope thereof, it is to be understood that I do not limit myself to the specific embodiments thereof except by the appended claims.

I claim:

1. A chemical compound having the probable formula

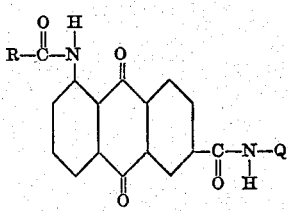

in which R represents the nucleus of a carbon compound and Q represents the nucleus of a carbon compound.

2. The process which comprises condensing 1-amino-anthraquinone-6-carboxylic acid with the carbonyl-halide of a carbon compound, converting the resultant to the corresponding anthraquinone-6-carbonyl-halide and condensing said last mentioned compound with an amino carbon compound.

3. The dyestuff having the probable formula

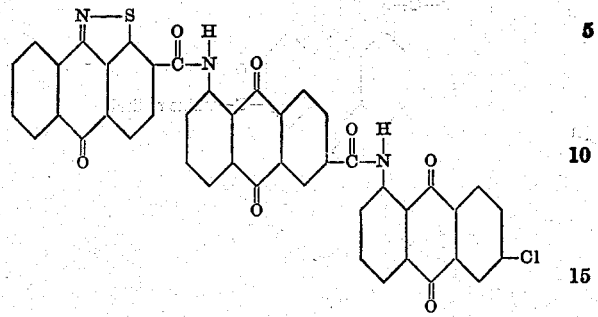

4. The process which comprises condensing 1-amino-anthraquinone-6-carboxylic-acid with 1:9-anthraisothiazole-2-carbonyl-chloride, converting the resultant carboxylic acid to a carbonyl-halide and condensing it with 1-amino-6-chloro-anthraquinone.

5. A chemical compound which has the formula

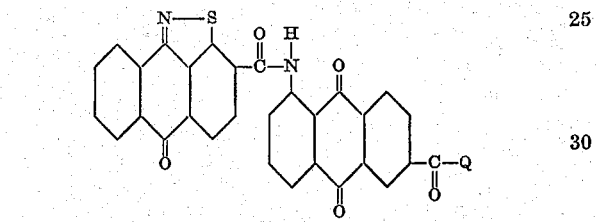

and in which Q represents the nucleus of a carbon compound.

6. A chemical compound which has the formula

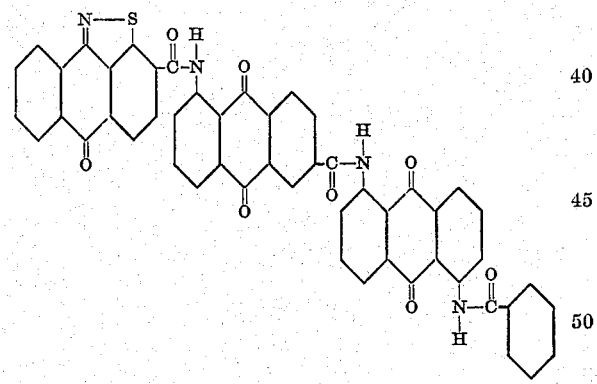

7. A chemical compound which has the formula

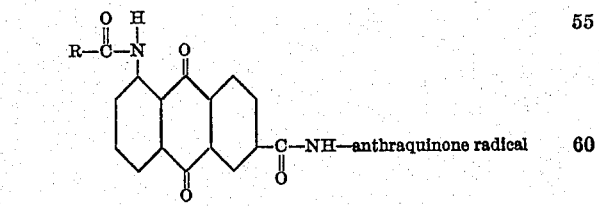

and in which R represents the nucleus of a carbon compound.

8. A chemical compound which has the formula

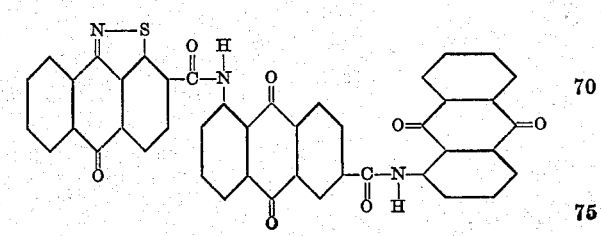

9. The chemical compound probably having the formula

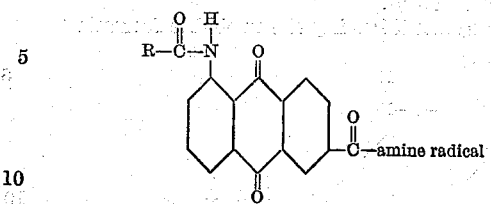

in which R represents the nucleus, radical or residue of a carbon compound and which results from condensing the carbonyl halide of a carbon compound with 1-amino-anthraquinone-6-carboxylic acid, converting the resultant acid to the corresponding carbonyl halide and condensing the last mentioned carbonyl halide with an amine.

RALPH N. LULEK.

Certificate of Correction

Patent No. 2,001,737. May 21, 1935.

RALPH NORBEIT LULEK

It is hereby certified that error appears in the printed specification of the above numbered patent requiring correction as follows: Page 5, lines 30 to 40, Example XIV, strike out the extreme right hand portion of the formula and insert instead—

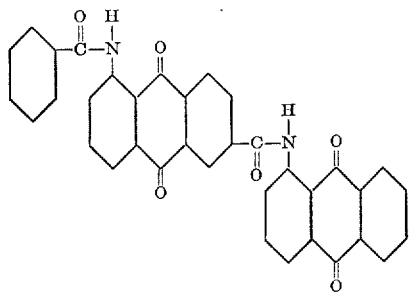

and that the said Letters Patent should be read with this correction therein that the same may conform to the record of the case in the Patent Office.

Signed and sealed this 20th day of August, A. D. 1935

[SEAL]

LESLIE FRAZER,
*Acting Commissioner of Patents.*